(12) United States Patent
Heap et al.

(10) Patent No.: US 8,775,000 B2
(45) Date of Patent: Jul. 8, 2014

(54) METHOD AND APPARATUS FOR CONTROLLING A MULTI-MODE POWERTRAIN SYSTEM

(75) Inventors: Anthony H. Heap, Ann Arbor, MI (US); Kee Yong Kim, Ann Arbor, MI (US); Samantha Victoria Lado, Pittsfield Township, MI (US); Jeffrey J. Waldner, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 13/568,070

(22) Filed: Aug. 6, 2012

(65) Prior Publication Data

US 2014/0039738 A1     Feb. 6, 2014

(51) Int. Cl.
*B60K 17/06*     (2006.01)

(52) U.S. Cl.
USPC .............................................. 701/22; 701/54

(58) Field of Classification Search
USPC ...................................................... 701/22, 54
See application file for complete search history.

(56) References Cited

U.S. PATENT DOCUMENTS

| | | | |
|---|---|---|---|
| 7,645,206 B2 | 1/2010 | Holmes et al. | |
| 2004/0259682 A1* | 12/2004 | Tabata et al. | 477/102 |
| 2009/0118942 A1* | 5/2009 | Hsieh et al. | 701/54 |
| 2010/0179009 A1 | 7/2010 | Wittkopp et al. | |

OTHER PUBLICATIONS

U.S. Appl. No. 13/570,175, Lado, et al.
U.S. Appl. No. 13/569,929, Diaz, et al.
U.S. Appl. No. 13/568,086, Heap, et al.
U.S. Appl. No. 13/568,070, Heap, et al.
U.S. Appl. No. 13/571,070, Heap, et al.
U.S. Appl. No. 13/568,071, Kim, et al.
U.S. Appl. No. 13/568,083, Heap, et al.

* cited by examiner

*Primary Examiner* — Mary Cheung
*Assistant Examiner* — Yuen Wong

(57) ABSTRACT

A method for operating a powertrain system includes selecting a plurality of candidate transmission ranges associated with a present powertrain operating point and deselecting candidate transmission ranges not associated with the present powertrain operating point. A high resolution engine speed/torque search is executed for each of the selected candidate transmission ranges. A low resolution engine speed/torque search is executed for each of the deselected candidate transmission ranges. Each search is executed to determine a respective minimum power cost for operating the powertrain system in one of the candidate transmission ranges in response to an output torque request and output speed. A preferred transmission range is determined from the candidate transmission ranges. A preferred engine operating point is determined corresponding to the minimum power cost for the preferred transmission range. The powertrain system is controlled in the preferred transmission range with the engine operating at the preferred engine operating point.

12 Claims, 3 Drawing Sheets

METHOD AND APPARATUS FOR CONTROLLING A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes a multimode transmission configured to transfer torque among an internal combustion engine, torque machines, and a driveline in one of a plurality of transmission ranges. A method for operating the powertrain system includes selecting a plurality of candidate transmission ranges associated with a present powertrain operating point and deselecting candidate transmission ranges not associated with the present powertrain operating point. A high resolution engine speed/torque search is executed for each of the selected candidate transmission ranges. A low resolution engine speed/torque search is executed for each of the deselected candidate transmission ranges. Each search is executed to determine a respective minimum power cost for operating the powertrain system in one of the candidate transmission ranges in response to an output torque request and output speed. A preferred transmission range is determined, and includes the candidate transmission range that is associated with a minimum of the respective minimum power costs. A preferred engine operating point is determined, and includes an engine speed/torque corresponding to the minimum power cost for the preferred transmission range. The powertrain system is controlled in the preferred transmission range with the engine operating at the preferred engine operating point corresponding to the preferred transmission range.

BRIEF DESCRIPTION OF THE DRAWINGS

One or more embodiments will now be described, by way of example, with reference to the accompanying drawings, in which.

DETAILED DESCRIPTION

Figure 1:
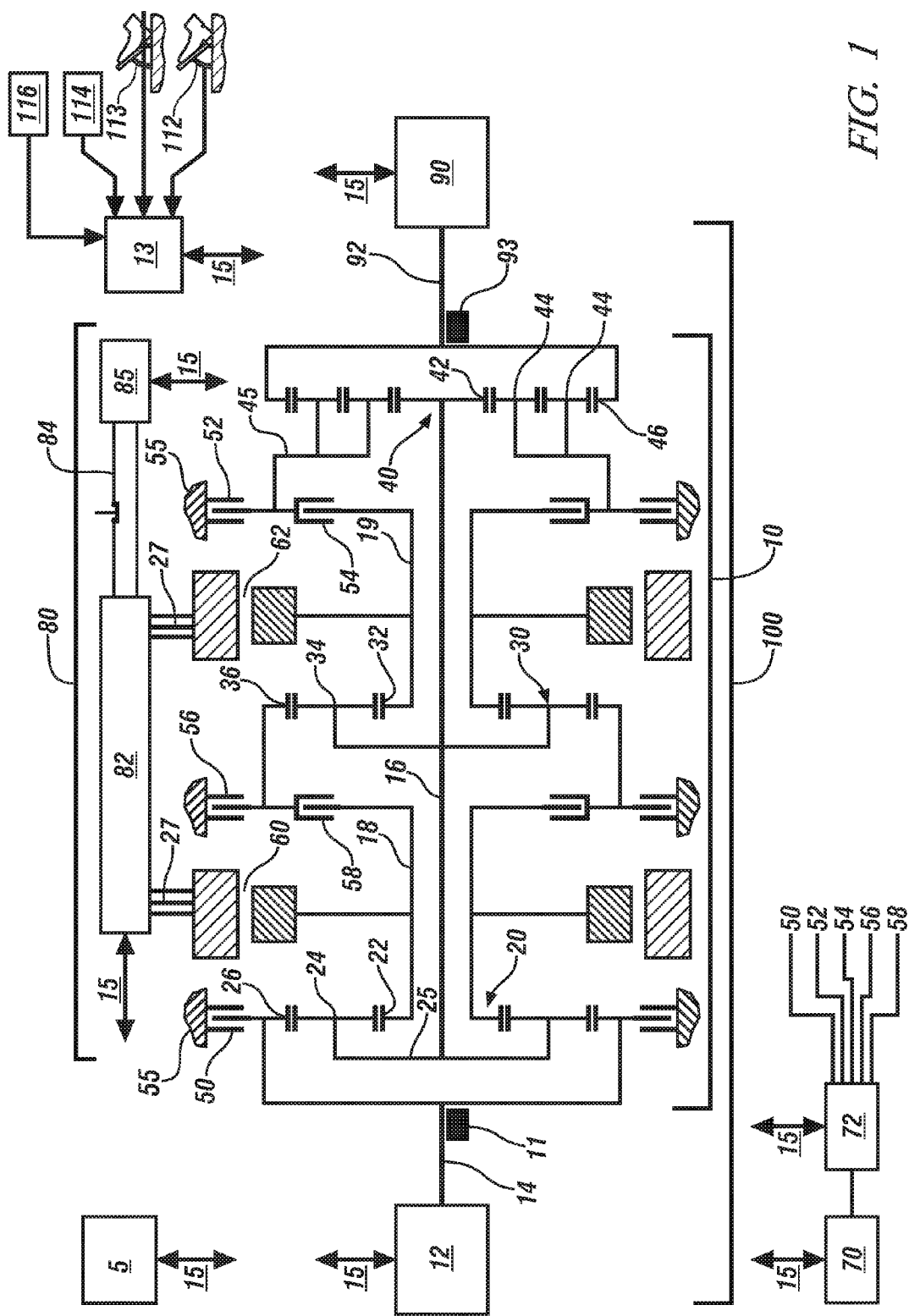
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the battery 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the battery 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands.

Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system, include commanding an output torque request and selecting a transmission range. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector 114 can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (neutral), fixed gear (Gear#), variable mode (EVT Mode#), electric vehicle (EV#) and transitional (EV Transitional State# and Pseudo-gear#) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | | x | | |
| Neutral 3 | ON(ALL/DEAC/FCO)/OFF | | | | x | |
| PseudoGear 1 | ON(ALL/DEAC/FCO)/OFF | x | | | | |
| PseudoGear 2 | ON(ALL/DEAC/FCO)/OFF | | x | | | |
| Neutral | OFF | | | | | x |
| EVT Mode 1 | ON(ALL/DEAC/FCO)/OFF | x | | x | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | | x | | | x |
| EV Transitional State 2 | OFF | | | x | | x |
| Gear 1 | ON(ALL/DEAC/FCO) | x | | x | x | |
| Gear 2 | ON(ALL/DEAC/FCO) | x | x | | x | |
| Gear 3 | ON(ALL/DEAC/FCO) | | x | x | x | |
| EV1 | OFF | x | | x | | x |
| EV2 | OFF | x | | | x | x |
| EV3 | OFF | | x | | x | x |
| EV4 | OFF | | | x | x | x |
| EV Transitional State 3 | OFF | x | x | | | x |
| Neutral | ON(ALL/DEAC/FCO)/OFF | | | x | x | |

TABLE 1-continued

| Range | Engine State | C1 | C2 | C3 | C4 | C5 |
|---|---|---|---|---|---|---|
| PseudoGear 3 | ON(ALL/DEAC/FCO)/OFF | x | x | | | |
| Neutral | OFF | | | x | | x |
| Neutral | OFF | | | | x | x |

A method for operating the multi-mode powertrain system 100 described with reference to FIG. 1 to transfer torque between the engine, torque machines, and the driveline includes selecting candidate transmission ranges associated with a present powertrain operating point and deselecting candidate transmission ranges not associated with the present powertrain operating point. This includes selecting and deselecting candidate transmission ranges associated with a powertrain operating point including an output torque and an output speed. The selected and deselected candidate transmission ranges are all of or a subset the available transmission ranges, e.g., as described with reference to Table 1. The basis for selecting specific ones of the transmission ranges and deselecting specific ones of the transmission ranges is shown graphically with reference to FIG. 3. High resolution engine speed/torque searches are executed to determine preferred engine operating points and power costs for operating the powertrain system in the selected candidate transmission ranges. Low resolution engine speed/torque searches are executed to determine preferred engine operating points and power costs for operating the powertrain system in the deselected candidate transmission ranges. One of the candidate transmission ranges is selected as a preferred transmission range based upon the power costs. This is described with reference to FIG. 2. Operation of the powertrain system is controlled in the preferred transmission range with the engine operating at the preferred engine operating point corresponding to the preferred transmission range.

Figure 2:
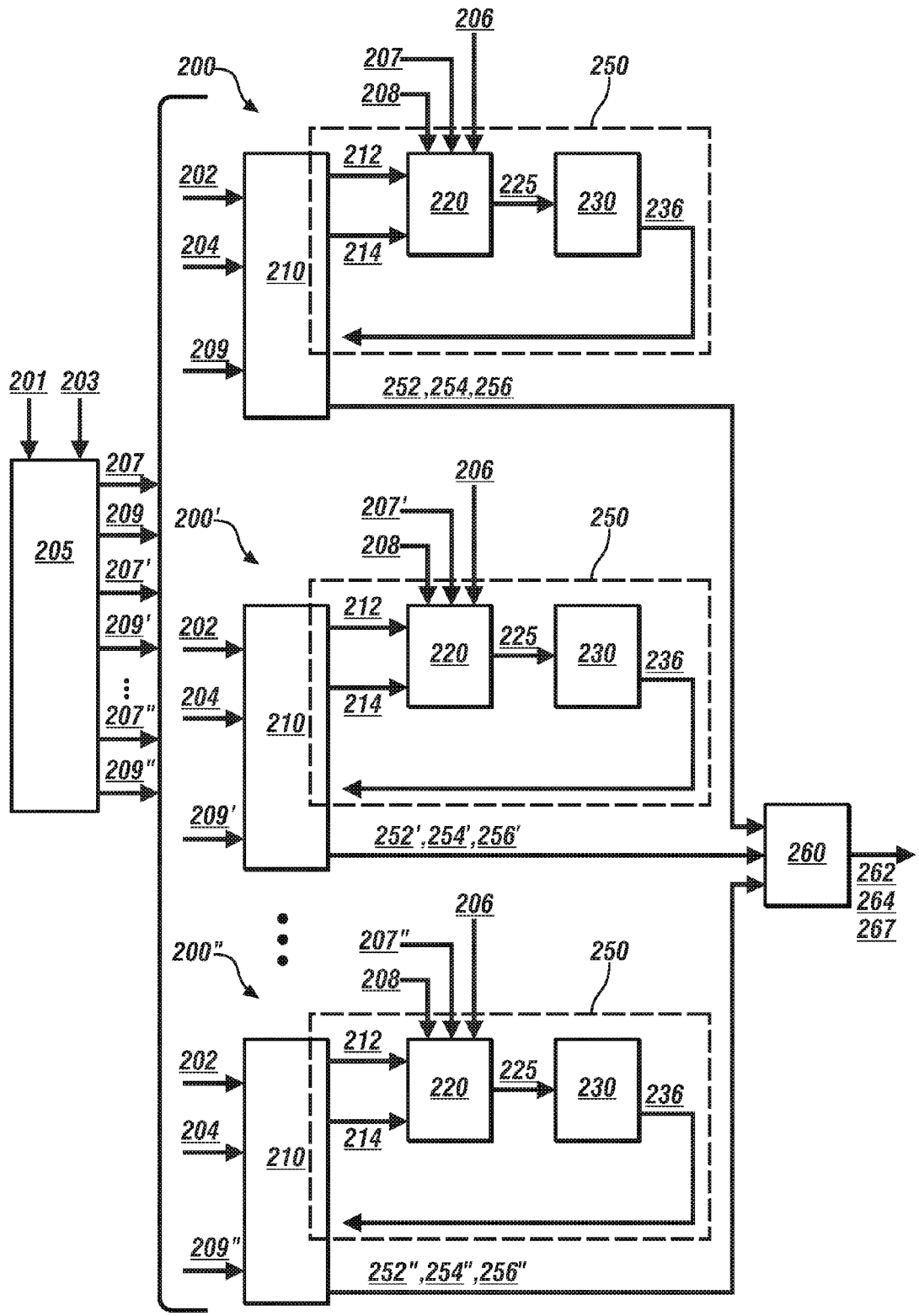
FIG. 2 illustrates a transmission range selection and deselection scheme and a plurality of search schemes configured to determine preferred engine speeds, preferred engine torque outputs, and corresponding power costs when operating the powertrain system in response to the output torque request, in accordance with the disclosure.

FIG. 2 schematically shows a transmission range selection and deselection scheme 205 and a plurality of search schemes 200, 200', . . . 200". The transmission range selection and deselection scheme 205 employs a transmission range selection/deselection space 330, an embodiment of which is shown with reference to FIG. 3. The transmission range selection and deselection scheme 205 selects specific ones of candidate transmission ranges and deselects specific ones of the candidate transmission ranges in relation to output torque and output speed of the powertrain system. Search schemes are preferably executed for all the candidate transmission ranges to determine preferred engine speeds 252, preferred engine torques 254, and corresponding minimum power costs 256 for each of the candidate transmission ranges when operating the powertrain system 100 in response to the output torque request 206 and output speed, as shown. The search schemes 200, 200', . . . 200" are preferably completely executed simultaneously, i.e., within the same loop cycle. Three of the search schemes 200, 200', . . . 200" are shown, but it is appreciated that the quantity of search schemes can be any suitable number consistent with the quantity of available transmission ranges. The quantity of search schemes 200, 200', . . . 200" correlates to the quantity of candidate transmission ranges. The quantity of candidate transmission ranges can be equal to the quantity of available transmission ranges or a subset thereof. A selection/arbitration scheme 260 identifies one of the candidate transmission ranges 207, 207', . . . 207" as a preferred transmission range, and controls operation of the powertrain system 100 in response. Each of the search schemes 200, 200', . . . 200" executes in an analogous manner as described herein.

The transmission range selection and deselection scheme 205 employs the transmission range selection/deselection space 330 to select or deselect the candidate transmission ranges 207, 207', . . . 207" in response to powertrain operating parameters, e.g., output speed 201 and output torque 203. Other operating parameters may be employed to select and deselect candidate transmission ranges in addition to or in replacement of the output speed 201 and output torque 203. By way of a non-limiting example, state of charge of the battery 85 may be employed as a third, additional operating parameter to select and deselect candidate transmission ranges. As shown, the candidate transmission ranges include transmission ranges 207, 207', . . . 207". By way of example, the candidate transmission ranges 207 and 207' are selected, and candidate transmission range 207" is deselected.

The output of the transmission range selection and deselection scheme 205 includes the candidate transmission ranges 207, 207', . . . 207", and corresponding quantity of search iterations 209, 209', . . . 209", respectively, which are provided as inputs to the respective search schemes 200, 200', . . . 200". The transmission range selection and deselection scheme 205 selects or deselects specific candidate transmission ranges by controlling quantities of iterations executed by the search schemes, thus controlling resolution of each of the searches. Thus each of the search schemes 200, 200', . . . 200" is commanded to execute a corresponding quantity of search iterations 209, 209', . . . 209". The transmission range selection and deselection scheme 205 commands a high resolution engine speed/torque for selected candidate transmission ranges, and commands a low resolution engine speed/torque for deselected candidate transmission ranges.

Each of the search schemes 200, 200', . . . 200" employs a search engine 210, 210', . . . 210" for determining a preferred engine speed 252 and a preferred engine torque output 254 within a predetermined input speed range 202 and input torque range 204 when operating the powertrain system 100 in response to an output torque request 206 and output speed with the transmission 10 in the candidate transmission range 207. When operating the engine in the all-cylinder state, the input speed range 202 traverses from engine idle speed, e.g., 800 to 1000 RPM, to a maximum achievable engine speed, i.e., redline. The maximum achievable engine speed is specific to an engine configuration and can be in the range of 5000 RPM to 8000 RPM. Similarly, the input torque range 204 traverses from a negative torque value associated with engine drag torque or pumping, e.g., −50 Nm, to a maximum engine torque output in response to high load operating conditions, e.g., >300 Nm in one embodiment. The maximum speed and torque values are provided for purposes of illustration. When operating the engine in the cylinder deactivation state, the input speed range 202 traverses from a minimum speed, e.g., 1000 RPM, and to a threshold cylinder deactivation engine speed, which is less than the maximum achievable engine speed in the all-cylinder state, and is specific to an engine configuration. As shown, the threshold cylinder deactivation engine speed is 3000 RPM. Similarly, the input torque range 204 traverses from a negative torque value associated with engine drag torque or pumping, e.g., −50 Nm, to a threshold cylinder deactivation engine torque output, e.g., 150 Nm in one embodiment. The values for the input speed range 202 and input torque range 204 are provided for purposes of illustration. The search scheme 200 generates a minimum power cost 256 associated with the preferred engine speed 252 and the preferred engine torque output 254. Alternatively, the input speed range 202 may be a selected portion of the range between engine idle speed, e.g., 800 to 1000 RPM, and the maximum achievable engine speed, i.e., redline. Alternatively, the input torque range 204 may be a selected the input speed range 202 portion of the range between the engine drag torque and the maximum engine torque output.

The input speed range 202 and input torque range 204 are provided to the two-dimensional search engine (search engine) 210. The search engine 210 iteratively generates a plurality of candidate engine speeds Ne(j) 212 across the input speed range 202 and a plurality of candidate engine torques T(j) 214, each which is input to an iteration loop 250. The designation (j) indicates an individual iteration. The iteration loop 250 employs a system torque optimization scheme 220, and a power cost model 230 to calculate a candidate power cost Pcost(j) 236 for each candidate engine speed Ne(j) 212 and each candidate engine torque T(j) 214. The search engine 210 monitors the candidate power costs Pcost(j) 236 for all iterations. The candidate engine speed Ne(j) 212 and candidate engine torque Te(j) 214 that achieve a minimum of the candidate power costs Pcost(j) 236 are selected by the search engine 210 as the preferred engine speed 252 and preferred engine torque 254. The preferred engine speed 252, preferred engine torque 254, and corresponding minimum power cost 256 are identified based upon execution of a plurality of iteration loops across the input speed range 202 and input torque range 204. When the candidate transmission range is selected, e.g., candidate transmission ranges 207 and 207' in this example, the corresponding quantity of search iterations 209 and 209', respectively, include a search space having a high resolution engine speed/torque, e.g., a 5×5 engine speed/torque resolution. Thus, in one embodiment the input speed range 202 is divided into five discrete engine speeds between the minimum engine speed and the maximum achievable engine speed, and the input torque range 204 is divided into five discrete engine torques between the minimum engine torque and the maximum engine torque output, with the search scheme 200 executing twenty five iterations to identify the preferred engine speed 252 and the preferred engine torque 254 for operating the powertrain system in each of the selected candidate transmission ranges 207 and 207'. When the candidate transmission range is deselected, e.g., candidate transmission range 207" in this example, the corresponding quantity of search iterations 209" may include a search space having a low resolution engine speed/torque, e.g., a 2×2 engine speed/torque resolution, or a 1×2 engine speed/torque resolution or another suitable low resolution engine speed/torque. Thus, in one embodiment the input speed range 202 is divided into two discrete engine speeds between the minimum engine speed limit and the maximum engine speed limit, and the input torque range 204 is divided into two discrete engine torques between the minimum engine torque limit and the maximum engine torque limit, with the search scheme 200 executing four iterations to identify the preferred engine speed 252 and the preferred engine torque 254 for operating the powertrain system in the deselected candidate transmission range 207". In this manner, computing resources can be employed to evaluate the selected candidate transmission ranges. The deselected candidate transmission ranges are evaluated to verify that their deselection is valid, but computing resources are not consumed in evaluating a candidate transmission range that has a low probability of success based upon previous analysis.

The system torque optimization scheme 220 employs the candidate engine speed Ne(j) 212, the candidate engine torque T(j) 214, an output torque request 206, output speed, the candidate transmission range 207, and powertrain system operating parameters 208 to determine an optimized candidate powertrain operating point 225 for operating in the candidate transmission range 207. The powertrain system operating parameters 208 include operating limits for the first and second torque machines 60, 62, e.g., minimum and maximum torques and minimum and maximum speeds, and operating limits for the battery 85, e.g., battery power limits including maximum discharge limits and maximum charge limits. The optimized candidate powertrain operating point 225 includes preferred operating parameters for the first and second torque machines 60, 62, e.g., torque and speed, and preferred operating parameters for the battery 85, e.g., battery power, in response to the output torque request 206 when the engine is operating at the candidate engine speed Ne(j) 212 and the candidate engine torque T(j) 214 and the transmission is operating in the candidate transmission range 207. The power cost model 230 employs a power cost function to determine a candidate power cost P(j) 236 for operating the powertrain at the optimized candidate powertrain operating point 225. An exemplary power cost function 230 is described with reference to FIG. 4.

The search engine 210 selects the preferred engine speed 252 and preferred engine torque 254 based upon the power costs for all the candidate engine speeds Ne(j) 212 and candidate engine torques T(j) 214. The preferred engine speed 252 and preferred engine torque 254 are the candidate engine speed Ne(j) 212 and the candidate engine torque T(j) 214 that result in a minimum total power cost for operating the powertrain system 100 in the candidate transmission range 207 in response to the output torque request 206.

Each of the search schemes 200, 200', ... 200" employs the corresponding search engine 210, 210', ... 210" to search within a predetermined speed/torque search window that defines an input speed range 202 and a torque range 204 while operating the powertrain system 100 in response to the output torque request 206 with the transmission 10 in one of the selected or deselected candidate transmission ranges 207, 207', ... 207". The search scheme 200 determines preferred engine speed 252, preferred engine torque output 254, and corresponding minimum power cost 256 when operating the powertrain system 100 in response to the output torque request 206 with the transmission 10 in the first candidate transmission range 207. The search scheme 200' determines preferred engine speed 252', preferred engine torque output 254', and corresponding minimum power cost 256' when operating the powertrain system 100 in response to the output torque request 206 with the transmission 10 in the second candidate transmission range 207'. The search scheme 200" determines preferred engine speed 252", preferred engine torque output 254", and corresponding minimum power cost 256" when operating the powertrain system 100 in response to the output torque request 206 with the transmission 10 in the third candidate transmission range 207". It is appreciated that there may be additional searches associated with other candidate transmission ranges.

The aforementioned speeds 252, 252' ... 252", torques 254, 254' ... 254" and minimum power costs 256, 256' ... 256" associated with the plurality of candidate transmission ranges 207, 207', ... 207" are input to the selection/arbitration block 260, which acts to select the candidate transmission range 207 having a minimum of the minimum power costs 256, 256' ... 256" as a preferred transmission range 267 for controlling the transmission 10 with the corresponding speed 252 and torque 254 employed as the preferred engine speed 262 and preferred engine torque 264 for controlling operation of the engine 12. The selection/arbitration block 260 employs hysteresis and other tactics to minimize shift busyness. The preferred engine speed 252 and preferred engine torque 254 can be employed to control operation of the engine 12 in the selected transmission range 207, with operation of the powertrain system 100 corresponding thereto.

Figure 3:
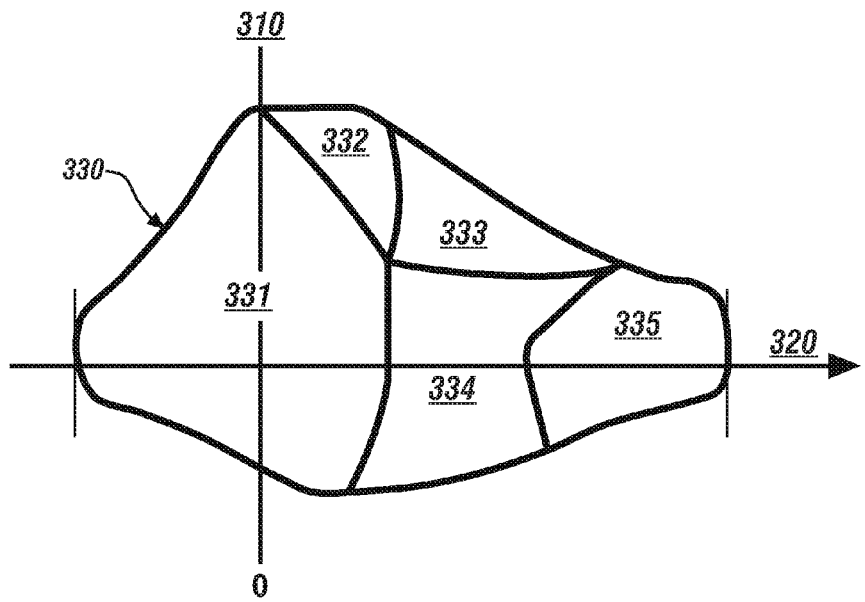
FIG. 3 illustrates a transmission range selection/deselection space that is preferably predetermined for an embodiment of a multi-mode powertrain system, in accordance with the disclosure.

FIG. 3 graphically shows a transmission range selection/deselection space 330 that is preferably predetermined for an embodiment of a multi-mode powertrain system. The transmission range selection/deselection space 330 is depicted in relation to output torque, shown on the vertical axis 310, and output speed, shown on the horizontal axis 320. Output torque/speed regions 331, 332, 333, 334, and 335 are identified, and provide a basis for selecting and deselecting specific transmission ranges, identified in Table 2 as transmission ranges A, B, C, D, E, and F. The process for selecting and deselecting transmission ranges includes identifying one of the output torque/speed regions 331, 332, 333, 334, and 335 based upon the output speed and output torque of the powertrain system, and selecting those transmission ranges are associated with the identified one of the output torque/speed regions and deselecting those transmission ranges that are not associated with the identified one of the torque/speed regions. Each of the output torque/speed regions 331, 332, 333, 334, and 335 contains a subset of the A, B, C, D, E, and F transmission ranges. The A, B, C, D, E, and F transmission ranges are meant to be illustrative, and correlate to specific transmission ranges associated with an embodiment of the multi-mode transmission 10, e.g., those described with reference to Table 1.

TABLE 2

| Torque/Speed Region | Selected Transmission Ranges | Deselected Transmission Ranges |
| --- | --- | --- |
| 331 | A, B | C, D, E, F |
| 332 | B, C | A, D, E, F |
| 333 | C, F | A, B, E, D |
| 334 | C, D | A, B, E, F |
| 335 | D, E | A, B, C, F |

The subsets of the A, B, C, D, E, and F transmission ranges are selected or deselected for specific output torque/speed regions for a specific transmission and powertrain configuration. The subsets of the A, B, C, D, E, and F transmission ranges may be selected or deselected based upon objective and/or subjective criteria, including results associated with power and/or fuel consumption, driveability, and component durability that can be determined using simulations, optimizations, and on-vehicle experience that indicate the powertrain system operates effectively in a selected transmission range and fails to operate effectively in a deselected transmission range. Thus, processor resources associated with simultaneous execution of a plurality of search schemes, e.g., the search schemes 200 described with reference to FIG. 2, can be focused on those selected transmission ranges having a high likelihood of successfully identifying the preferred transmission range 267 and corresponding preferred speed 262 and preferred torque 264 for controlling operation of the engine 12. There may be more or fewer transmission ranges depending upon the specific configuration of the multi-mode transmission. Furthermore there may be more or fewer selected and deselected transmission ranges for each torque/speed region. Furthermore there may be more or fewer speed/torque regions.

Figure 4:
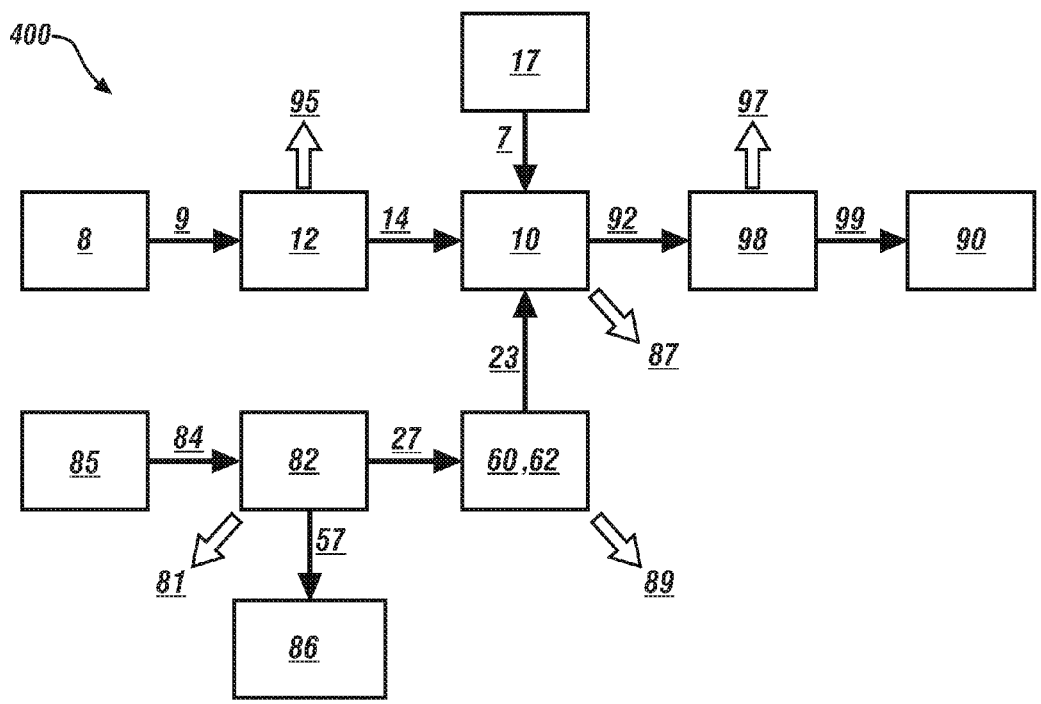
FIG. 4 illustrates an exemplary power cost function including an analytic framework for determining powertrain system operating costs, in accordance with the disclosure.

FIG. 4 schematically illustrates an exemplary power cost function 400 including an analytic framework for determining powertrain system operating costs, which is described with reference to the multi-mode powertrain system 100 described with reference to FIG. 1. Powertrain elements include engine 12, transmission 10, non-combustion torque machines 60, 62, battery 85, inverter 82, wheel brakes 98, driveline 90, and a fuel storage system 8. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 between the wheel brakes 98 and the driveline 90. Power losses include engine power losses 95, battery power losses 81, mechanical power losses 87, electric motor losses 89, and brake power losses 97. The power cost inputs to the power cost function 400 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 10 and the non-combustion torque machines 60, 62. The power cost function 400 may be employed to determine a total power cost for operating at a selected engine operating point while operating the powertrain system responsive to an output torque request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and a driveline in one of a plurality of fixed gear, variable mode and electric vehicle transmission ranges, the method comprising:

selecting candidate transmission ranges associated with a present powertrain operating point and deselecting other candidate transmission ranges not associated with the present powertrain operating point, the candidate transmission ranges comprising the fixed gear, variable mode and electric vehicle transmission ranges;

executing a high resolution engine speed/torque search for each of the selected candidate transmission ranges and executing a low resolution engine speed/torque search for each of the deselected candidate transmission ranges, each of said searches executed to determine a respective minimum power cost for operating the powertrain system in the candidate transmission range in response to an output torque request and output speed, wherein executing the high resolution engine speed/torque search for the selected candidate transmission ranges comprises:
    dividing an input speed range into at least five discrete engine speeds and dividing an input torque range into at least five discrete engine torques, and
    iteratively executing the high resolution engine speed/torque search at each of the discrete engine speeds and each of the discrete engine torques to determine the respective minimum power cost for operating the powertrain system in the candidate transmission range in response to the output torque request and the output speed; and wherein executing the low resolution engine speed/torque search for the deselected candidate transmission ranges comprises:
    dividing an input speed range into no more than two discrete engine speeds and dividing an input torque range into no more than two discrete engine torques; and
    iteratively executing the low resolution engine speed/torque search at each of the discrete engine speeds and each of the discrete engine torques to determine the respective minimum power cost for operating the powertrain system in the candidate transmission range in response to the output torque request and the output speed;
determining a preferred transmission range comprising the candidate transmission range associated with a minimum of the respective minimum power costs and determining a preferred engine operating point comprising an engine speed/torque corresponding to the minimum power cost for the preferred transmission range; and
controlling, by a controller, operation of the powertrain system in the preferred transmission range with the engine operating at the preferred engine operating point corresponding to the preferred transmission range.

2. The method of claim 1, wherein selecting candidate transmission ranges associated with the present powertrain operating point comprises:
    identifying one of a plurality of transmission output torque/speed regions based upon the present powertrain operating point; and
    selecting transmission ranges associated with the identified transmission output torque/speed region.

3. The method of claim 1, wherein deselecting other candidate transmission ranges not associated with the present powertrain operating point comprises:
    identifying one of a plurality of transmission output torque/speed regions based upon the present powertrain operating point; and
    deselecting transmission ranges not associated with the identified transmission output torque/speed region.

4. A method for operating a powertrain system including a multi-mode transmission configured to transfer torque among an engine, torque machines, and a driveline in one of a plurality of fixed gear, variable mode and electric vehicle transmission ranges, the method comprising:
    selecting a plurality of candidate transmission ranges and deselecting other candidate transmission ranges, the candidate transmission ranges comprising the fixed gear, variable mode and electric vehicle transmission ranges;
    simultaneously executing a plurality of high resolution engine speed/torque searches associated with the selected candidate transmission ranges and a plurality of low resolution engine speed/torque searches associated with the deselected candidate transmission ranges, each of said searches executed to determine a respective minimum power cost for operating the powertrain system in the candidate transmission range in response to an output torque request and output speed;
    determining a preferred transmission range comprising the candidate transmission range associated with a minimum of the respective minimum power costs; and
    controlling, by a controller, operation of the powertrain system in the preferred transmission range with the engine operating at an engine operating point corresponding to the respective minimum power cost for the preferred transmission range;
    wherein executing the high resolution engine speed/torque searches for the selected candidate transmission ranges comprises:
        dividing an input speed range into a plurality of discrete engine speeds and dividing an input torque range into a plurality of discrete engine torques, and
        iteratively executing said searches at each of the discrete engine speeds and each of the discrete engine torques to determine the respective minimum power cost for operating the powertrain system in the candidate transmission range in response to the output torque request and the output speed; and
    wherein executing the low resolution engine speed/torque searches for the deselected candidate transmission ranges comprises:
        selecting two discrete engine speeds and selecting a single discrete engine torque, and
        iteratively executing said search at each of the two discrete engine speeds and the single discrete engine torque to determine the respective minimum power cost for operating the powertrain system in the candidate transmission range in response to the output torque request and the output speed.

5. The method of claim 4, further comprising iteratively executing the high resolution engine speed/torque searches to determine a preferred engine operating point for operating the powertrain system in the selected candidate transmission range.

6. The method of claim 4, further comprising iteratively executing the low resolution engine speed/torque searches to determine a preferred engine operating point for operating the powertrain system in the deselected candidate transmission range.

7. The method of claim 4, wherein selecting the plurality of candidate transmission ranges associated with a present powertrain operating point comprises:
    identifying one of a plurality of transmission output torque/speed regions based upon the present powertrain operating point; and
    selecting transmission ranges associated with the identified transmission output torque/speed region.

8. The method of claim 4, wherein deselecting other candidate transmission ranges comprises:
    identifying one of a plurality of transmission output torque/speed regions based upon the present powertrain operating point; and
    deselecting transmission ranges not associated with the identified transmission output torque/speed region.

9. The method of claim 4, wherein simultaneously executing the plurality of searches comprises executing the plurality of searches within a single loop cycle.

10. A method for operating a powertrain system including a multi-mode transmission configured to transfer torque among an engine, torque machines, and a driveline in one of a plurality of fixed gear, variable mode and electric vehicle transmission ranges, the method comprising:
   determining a powertrain operating point comprising an output torque and an output speed of the powertrain system;
   selecting a plurality of candidate transmission ranges based upon the powertrain operating point and deselecting other candidate transmission ranges based upon the powertrain operating point, the candidate transmission ranges comprising the fixed gear, variable mode and electric vehicle transmission ranges;
   simultaneously executing a plurality of high resolution engine speed/torque searches associated with the selected candidate transmission ranges and a plurality of low resolution engine speed/torque searches associated with the deselected candidate transmission ranges, each of said searches executed to determine a respective minimum power cost for operating the powertrain system in the candidate transmission range;
   determining a preferred transmission range comprising the candidate transmission range associated with a minimum of the respective minimum power costs; and
   controlling, by a controller, operation of the powertrain system in the preferred transmission range with the engine operating at an engine operating point corresponding to the respective minimum power cost for the preferred transmission range;
   wherein executing each high resolution engine speed/torque search for the selected candidate transmission ranges comprises:
      dividing an input speed range into a plurality of discrete engine speeds and dividing an input torque range into a plurality of discrete engine torques, and
      iteratively executing said search at each of the discrete engine speeds and each of the discrete engine torques to determine the respective minimum power cost for operating the powertrain system in the candidate transmission range in response to the output torque request and the output speed; and
   wherein executing each low resolution engine speed/torque search for the deselected candidate transmission ranges comprises:
      selecting two discrete engine speeds and selecting a single discrete engine torque, and
      iteratively executing said search at each of the two discrete engine speeds and the single discrete engine torque to determine the respective minimum power cost for operating the powertrain system in the candidate transmission range in response to the output torque request and the output speed.

11. The method of claim 10, further comprising iteratively executing the high resolution engine speed/torque search to determine a preferred engine operating point for operating the powertrain system in the selected candidate transmission range.

12. The method of claim 10, further comprising iteratively executing the low resolution engine speed/torque search to determine a preferred engine operating point for operating the powertrain system in the deselected candidate transmission range.

* * * * *